United States Patent
Agapi et al.

(10) Patent No.: US 8,355,918 B2
(45) Date of Patent: Jan. 15, 2013

(54) METHOD AND ARRANGEMENT FOR MANAGING GRAMMAR OPTIONS IN A GRAPHICAL CALLFLOW BUILDER

(75) Inventors: Ciprian Agapi, Hollywood, FL (US); Felipe Gomez, Weston, FL (US); James R. Lewis, Delray Beach, FL (US); Vanessa V. Michelini, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/344,193

(22) Filed: Jan. 5, 2012

(65) Prior Publication Data

US 2012/0209613 A1 Aug. 16, 2012

Related U.S. Application Data

(63) Continuation of application No. 10/726,102, filed on Dec. 2, 2003, now abandoned.

(51) Int. Cl.
*G10L 15/00* (2006.01)

(52) U.S. Cl. ........... 704/257; 704/9; 704/8; 704/278; 704/277; 704/276; 704/275; 704/270; 704/260; 704/242; 704/235; 704/1; 455/414.1; 379/88.16; 379/265.01; 379/201.02; 707/104.1; 705/346

(58) Field of Classification Search .......... 704/235, 704/270, 277, 9, 8, 278, 276, 275, 260, 242, 704/1; 707/104.1; 705/346; 455/414.1; 379/88.16, 265.01, 201.02

See application file for complete search history.

(56) References Cited

U.S. PATENT DOCUMENTS

| | | | | |
|---|---|---|---|---|
| 4,864,501 A | * | 9/1989 | Kucera et al. | 704/8 |
| 5,617,578 A | * | 4/1997 | Kroll et al. | 704/9 |
| 5,704,060 A | * | 12/1997 | Del Monte | 1/1 |
| 5,799,273 A | | 8/1998 | Mitchell et al. | |
| 5,812,977 A | * | 9/1998 | Douglas | 704/275 |
| 5,903,867 A | * | 5/1999 | Watari et al. | 704/270 |
| 5,940,797 A | * | 8/1999 | Abe | 704/260 |
| 5,970,460 A | * | 10/1999 | Bunce et al. | 704/278 |
| 6,064,961 A | * | 5/2000 | Hanson | 704/260 |
| 6,100,891 A | | 8/2000 | Thorne | |
| 6,112,174 A | | 8/2000 | Wakisaka et al. | |
| 6,173,266 B1 | * | 1/2001 | Marx et al. | 704/270 |
| 6,181,927 B1 | * | 1/2001 | Welling et al. | 455/414.1 |
| 6,246,981 B1 | | 6/2001 | Papineni et al. | |
| 6,269,336 B1 | | 7/2001 | Ladd et al. | |
| 6,321,198 B1 | | 11/2001 | Hank et al. | |

(Continued)

OTHER PUBLICATIONS

Thomson, David L., "Standardizing VoiceXML Generation tools", Feb. 7, 2003, VoiceXML FORUM, vol. 2, Issue 7.

*Primary Examiner* — Michael Colucci
(74) *Attorney, Agent, or Firm* — Wolf, Greenfield & Sacks, P.C.

(57) ABSTRACT

A method (10) in a speech recognition application callflow can include the steps of assigning (11) an individual option and a pre-built grammar to a same prompt, treating (15) the individual option as a valid output of the pre-built grammar if the individual option is a potential valid match to a recognition phrase (12) or an annotation (13) in the pre-built grammar, and treating (14) the individual option as an independent grammar from the pre-built grammar if the individual option fails to be a potential valid match to the recognition phrase or the annotation in the pre-built grammar.

2 Claims, 3 Drawing Sheets

U.S. PATENT DOCUMENTS

| | | |
|---|---|---|
| 6,490,564 B1 | 12/2002 | Dodrill et al. |
| 6,510,411 B1 | 1/2003 | Norton et al. |
| 6,574,595 B1 * | 6/2003 | Mitchell et al. ............... 704/242 |
| 6,578,000 B1 | 6/2003 | Dodrill et al. |
| 6,714,905 B1 * | 3/2004 | Chang et al. ...................... 704/9 |
| 6,961,700 B2 | 11/2005 | Mitchell et al. |
| 7,024,348 B1 | 4/2006 | Scholz et al. |
| 7,065,201 B2 * | 6/2006 | Bushey et al. ........... 379/265.01 |
| 7,099,824 B2 | 8/2006 | Kushida et al. |
| 2002/0032564 A1 * | 3/2002 | Ehsani et al. ................. 704/235 |
| 2002/0184002 A1 | 12/2002 | Galli |
| 2003/0018476 A1 | 1/2003 | Yuen et al. |
| 2003/0041314 A1 | 2/2003 | Heeren et al. |
| 2003/0083882 A1 | 5/2003 | Schmers, III et al. |
| 2003/0144846 A1 * | 7/2003 | Denenberg et al. ........... 704/277 |
| 2003/0195739 A1 * | 10/2003 | Washio ............................. 704/1 |
| 2003/0215075 A1 * | 11/2003 | Schwab et al. ........... 379/201.02 |
| 2004/0032934 A1 * | 2/2004 | Malik ....................... 379/88.16 |
| 2004/0210443 A1 * | 10/2004 | Kuhn et al. .................... 704/276 |
| 2005/0086102 A1 * | 4/2005 | Harrison et al. ................ 705/14 |

\* cited by examiner

METHOD AND ARRANGEMENT FOR MANAGING GRAMMAR OPTIONS IN A GRAPHICAL CALLFLOW BUILDER

RELATED APPLICATION

This Application claims the benefit under 35 U.S.C. § 120 and is a continuation of U.S. application Ser. No. 10/726,102, entitled "METHOD AND ARRANGEMENT FOR MANAGING GRAMMAR OPTIONS IN A GRAPHICAL CALLFLOW BUILDER" filed on Dec. 2, 2003, which is herein incorporated by reference in its entirety.

BACKGROUND OF THE INVENTION

1. Technical Field

This invention relates to the field of graphical user interfaces and more particularly to a graphical call flow builder.

2. Description of the Related Art

Systems exist that allow callflow designers to write simple grammar options or separately select prebuilt grammar files in graphical callflow builders. Some systems are described below. There is no system that allows designers who do not have any technical knowledge of speech grammars to both select a pre-built grammar file and write in the same element of a callflow. Furthermore, there is no other system that lets a designer select a specific output of a prebuilt grammar for special treatment in a callflow. The system we describe below overcomes these problems.

One such system, as described in U.S. Pat. No. 6,510,411, discusses a simplification of the process of developing call or dialogue flows for use in an Interactive Voice Response system where three principal aspects of the invention include a task-oriented dialogue model (or task model), a development tool and a dialogue manager. The task model is a framework for describing the application-specific information needed to perform the task. The development tool is an object that interprets a user specified task model and outputs information for a spoken dialogue system to perform according to the specified task model. The dialogue manager is a runtime system that uses output from the development tool in carrying out interactive dialogues to perform the task specified according to the task model. The dialogue manager conducts the dialogue using the task model and its built-in knowledge of dialogue management. Plus, generic knowledge of how to conduct a dialogue is separated from the specific information to be collected in a particular application. It is only necessary for the developer to provide the specific information about the structure of a task, leaving the specifics of dialogue management to the dialogue manager. This invention describes a form-based method for developing very simple speech applications, and does not address at all the use of external grammar files.

Another system, U.S. Pat. No. 6,269,336, discusses a voice browser for interactive services. A markup language document, as described in the U.S. Pat. No. 6,269,336 patent, includes a dialogue element including a plurality of markup language elements. Each of the plurality of markup language elements is identifiable by at least one markup tag. A step element is contained within the dialogue element to define a state within the dialogue element. The step element includes a prompt element and an input element. The prompt element includes an announcement to be read to the user. The input element includes at least one input that corresponds to a user input. A method in accordance with the present invention includes the steps of creating a markup language document having a plurality of elements, selecting a prompt element, and defining a voice communication in the prompt element to be read to the user. The method further includes the steps of selecting an input element and defining an input variable to store data inputted by the user. Although this invention describes a markup language similar, but not identical to, VoiceXML, and includes the capacity (like VoiceXML) to refer to either built-in or external grammars, it does not address the resolution of specific new options with the contents of existing grammars.

U.S. Pat. No. 6,173,266 discusses a dialogue module that includes computer readable instructions for accomplishing a predefined interactive dialogue task in an interactive speech application. In response to user input, a subset of the plurality of dialogue modules are selected to accomplish their respective interactive dialogue tasks in the interactive speech application and are interconnected in an order defining the callflow of the application, and the application is generated. A graphical user interface represents the stored plurality of dialogue modules as icons in a graphical display in which icons for the subset of dialogue modules are selected in the graphical display. In response to user input, the icons for the subset of dialogue modules are graphically interconnected into a graphical representation of the call flow of the interactive speech application, and the interactive speech application is generated based upon the graphical representation. Using the graphical display, the method further includes associating configuration parameters with specific dialogue modules. Once again, this existing invention describes a graphical callflow builder using dialogue modules as elements, but does not address the resolution of specific new options with the contents of existing grammars.

SUMMARY OF THE INVENTION

Embodiments in accordance with the invention can enable callflow designers to work more efficiently with lists of variables in a graphical callflow builder, particularly where users can create their own variable names. Furthermore, embodiments disclosed herein overcome the problems described above through the automatic evaluation of options added to prompts in a graphical callflow when the prompt is using one or more existing grammars. The nature of this evaluation is to determine if the added options are present in one or more of the existing grammars. If not present, the added prompts are used as external referents for use in the graphical callflow and become part of a new generated grammar. If present, the added prompts are only used as external referents for use in the graphical callflow and do not become part of a new generated grammar.

In a first aspect of the invention, a method for a speech recognition application callflow can include the steps of placing a prompt into a workspace for the speech recognition application workflow and attaching at least one among a pre-built grammar and a user-entered individual new option to the prompt. The pre-built grammars can be selected from a list. The method can further include the step of searching the list of pre-built grammars for matches to the user-entered individual new option. If a match exists between the pre-built grammar and the user-entered individual new option, then the user-entered individual new option can point to an equivalent pre-built grammar. If a match exists between the pre-built grammar and the user-entered individual new option, then the user-entered individual new option can form a part of the list of pre-built grammars.

In a second aspect of the invention, a method in a speech recognition application callflow can include the steps of assigning a individual option and a pre-built grammar to the same prompt, treating the individual option as a valid output of the pre-built grammar if the individual option is a potential valid match to a recognition phrase or an annotation in the pre-built grammar, and treating the individual option as an independent grammar from the pre-built grammar if the individual option fails to be a potential valid match to the recognition phrase or the annotation in the pre-built grammar.

In a third aspect of the invention, a system for managing grammar options in a graphical callflow builder can include a memory and a processor. The processor can be programmed to place a prompt into a workspace for the speech recognition application workflow and to attach at least one among a pre-built grammar and a user-entered individual new option to the prompt.

In a fourth aspect of the invention, a computer program has a plurality of code sections executable by a machine for causing the machine to perform certain steps as described in the method and systems above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

In our proposed system, designers can put a prompt into a workspace, then attach either prebuilt grammars from a list or attach individual new options, or both. To keep the system as parsimonious as possible, and to prevent potential conflicts between multiple grammars, if the user combines a prebuilt grammar and any new options, the system searches the pre-built grammar for any matches to the new options, searching both valid utterances and associated annotations. If the new option exists in the grammar, the 'new' option simply points to the equivalent grammar entry. Otherwise, the new option becomes part of a grammar automatically built to hold it, with the entry in the new grammar having the text of the new option as both the recognition string and an associated annotation. Thus, without any deep understanding of the structure of a speech recognition grammar, callflow designers can create or work with grammars with a high degree of flexibility.

Figure 1:
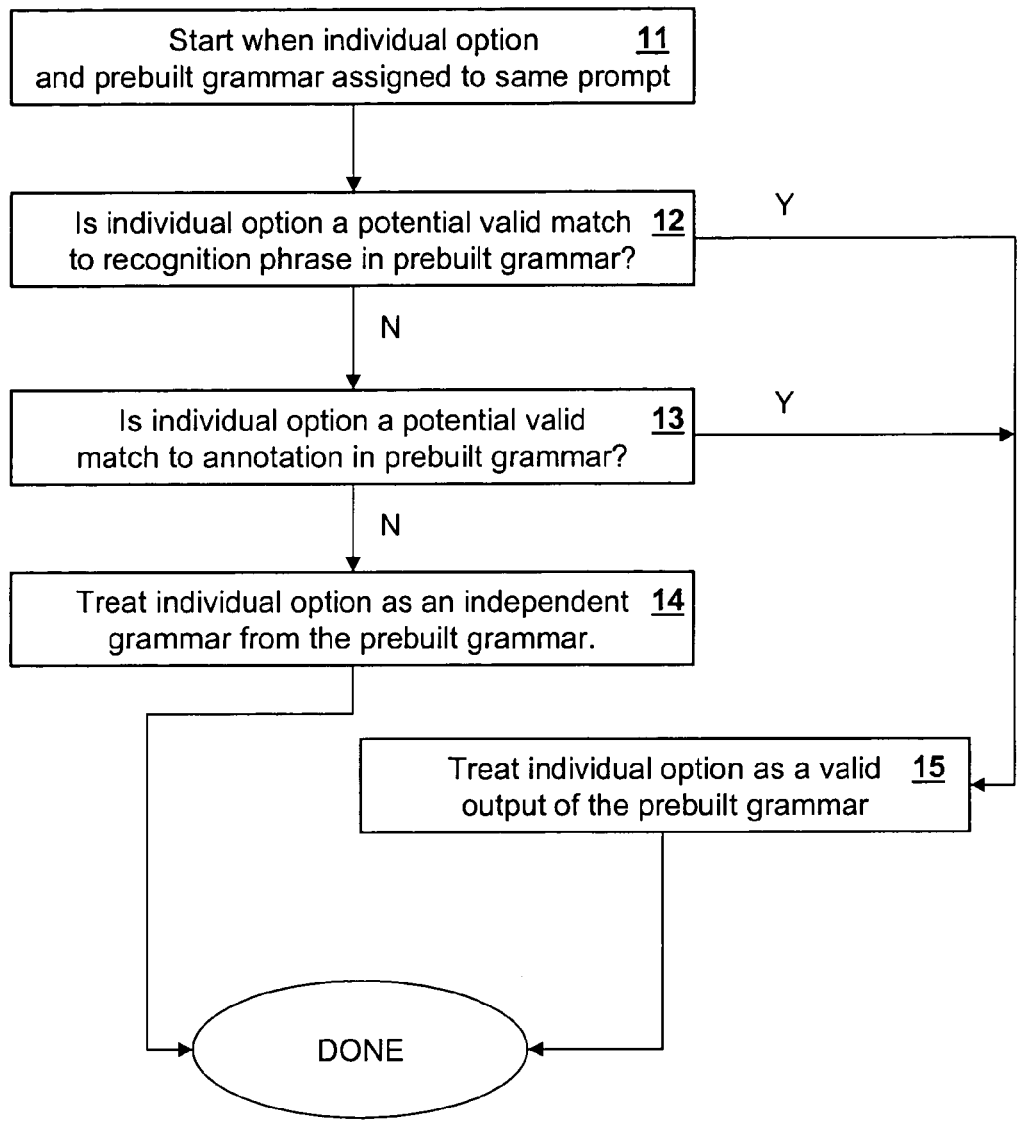
FIG. 1 is a flow diagram illustrating a method in a speech recognition application callflow in accordance with the present invention.

Referring to FIG. 1, a high-level flowchart of a method 10 in a speech recognition application callflow. The method 10 can include the step 11 of assigning an individual option and a pre-built grammar to the same prompt. At decision block 12, if the individual option is a potential valid match to a recognition phrase, then the method treats the individual option as a valid output of the pre-built grammar at step 15. Likewise, at decision block 13, if the individual option is a potential valid match to an annotation in the pre-built grammar, then the method also treats the individual option as a valid output of the pre-built grammar at step 15. If the individual option fails to be a potential valid match to the recognition phrase or the annotation in the pre-built grammar, then the individual option can be treated as an independent grammar from the pre-built grammar at step 14.

Figure 2:
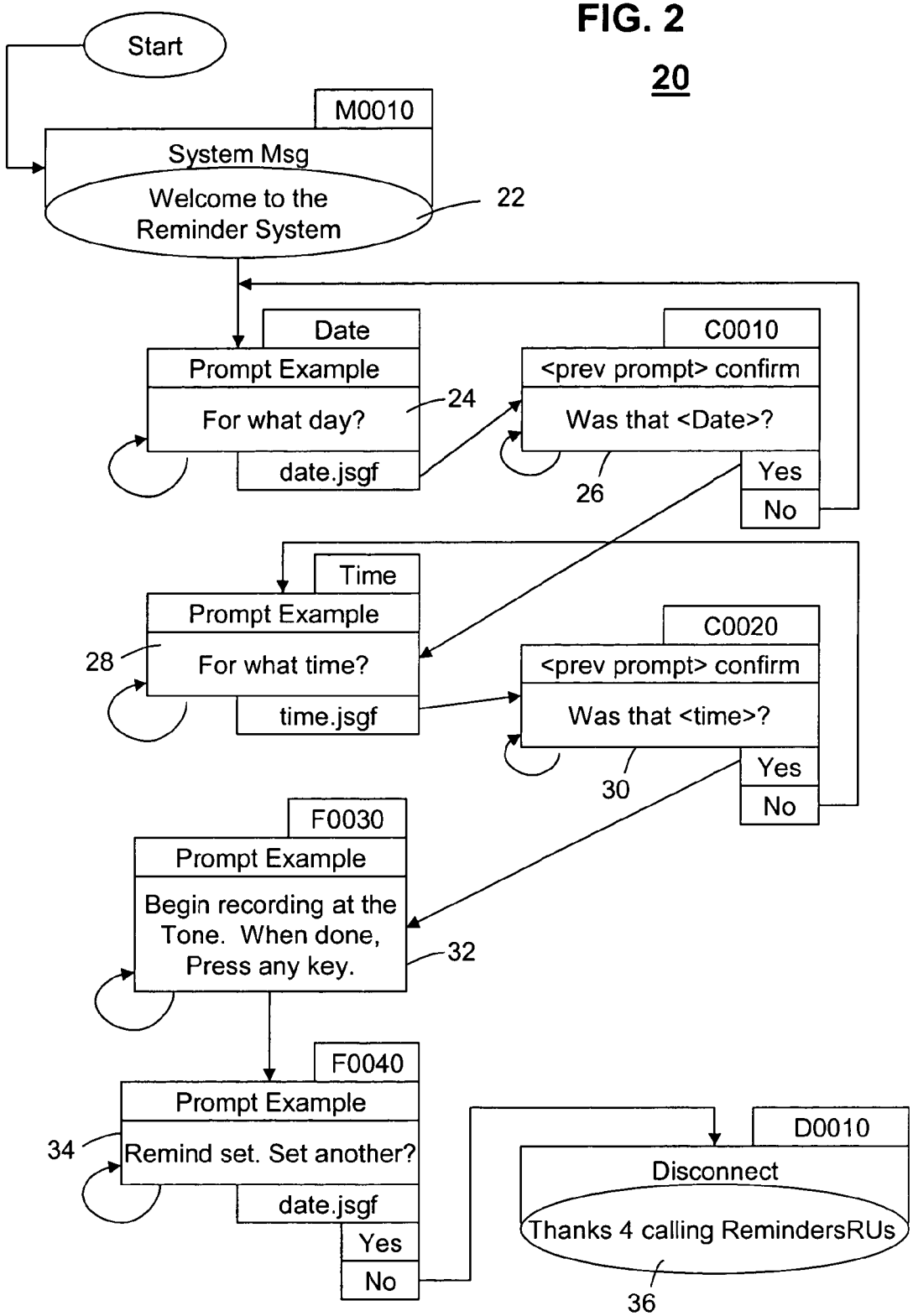
FIG. 2 is an exemplary instantiation of a callflow GUI with system and user-generated labels for callflow elements in accordance with the present invention.

Referring to FIG. 2, a possible instantiation of a callflow GUI with system- and user-generated labels for callflow elements is shown in accordance with the present invention. In particular, the callflow GUI 20 illustrates a reminder system where callflow element 22 welcomes the user to the system. Callflow element 24 determines a particular date using user defined variable "Date", the value of which will be an output of the grammar named date.jsgf. Callflow element 26 confirms an entry for the date. Callflow element 28 determines a time using user defined variable 'time', the value of which will be an output of the grammar named time.jsgf. Callflow element 30 then confirms the entry from the time. Callflow element 32 then prompts the user to record at the tone and callflow element 34 prompts the user to determine if another reminder is desired. Note that the prompt in 34 can take as speech input any valid phrase in the date.jsgf grammar plus 'Yes' or 'No'. Without inspection, it is not possible to determine whether 'Yes' and/or 'No' are valid phrases in the date.jsgf grammar. For example, suppose the designer has created the callflow shown in FIG. 2, with 'Yes' and 'No' defined as valid responses to the prompt in 34 along with the date.jsgf grammar. The high-level flowchart of FIG. 1 would then illustrate the actions a system would take in evaluating these options as previously described above. If no further reminders are to be set, then the callflow element 36 provides a goodbye greeting.

Figure 3A:
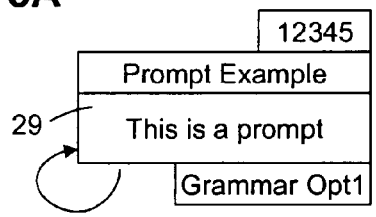
FIGS. 3A and 3B illustrate a callflow element prompt and callflow element in accordance with the present invention.
Figure 3B:
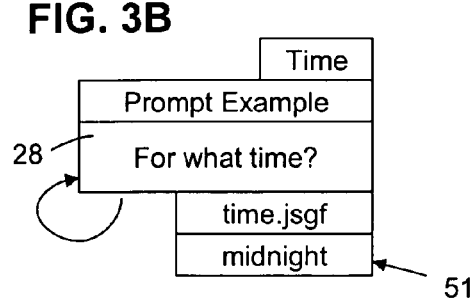

Assume that a system exists for the graphical building of speech recognition callflows. A key component of such a system would be a prompt—a request for user input. The prompt could have a symbolic representation similar to the call flow element 29 shown in FIG. 3A. Note that the symbol contains an automatically-generated label ("12345"), prompt text ("This is a prompt"), and a placeholder for a grammar option. Through some well-known means (property sheet, drag-and-drop, etc.), the designer can select from a set of prebuilt grammars (such as the built-in types in VoiceXML, custom-built grammars from a library, etc.) a grammar for the prompt as shown in FIG. 3B. The designer can also select one or more additional options for recognition at that prompt.

Figure 4:
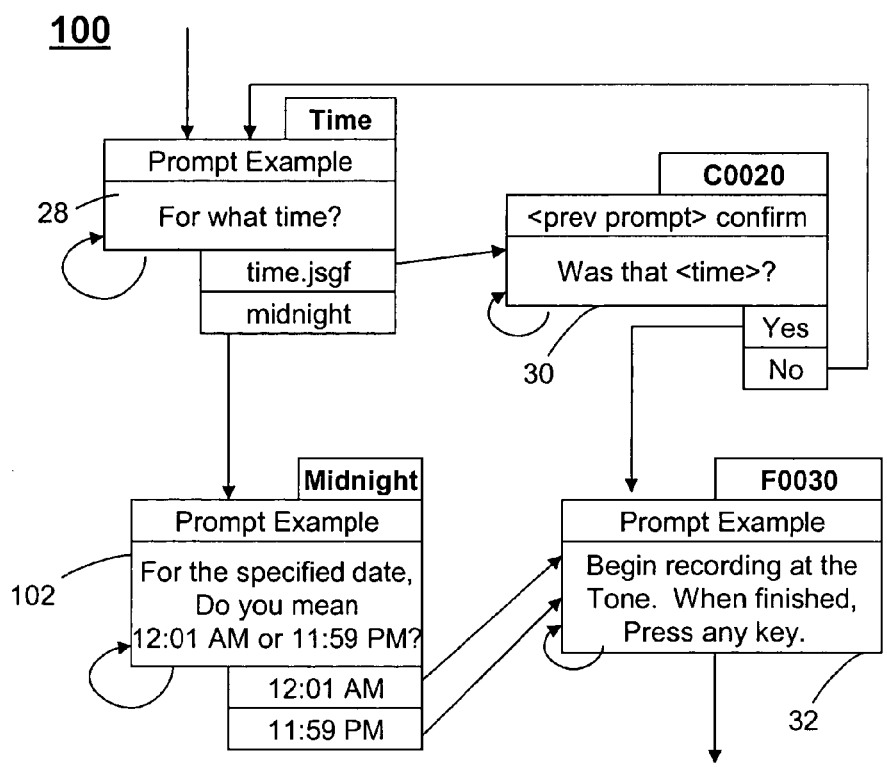
FIG. 4 is a portion of an exemplary instantiation of a callflow GUI in accordance with the present invention.

For example, suppose the designer has created the callflow shown in FIG. 4, then determines that there is a need to disambiguate 'midnight' as a special case if spoken in response to the request for the reminder time. The callflow element 102 of FIG. 4 and the high-level flowchart of FIG. 1 would then illustrate the actions a system would take in evaluating this new option as previously described above.

While these techniques can be generalized to any code generated from the callflow, here is an example of a VoiceXML form capable of being automatically generated from the information provided in the graphical callflow for the Time prompt (assuming that 'midnight' was NOT a valid input or annotation or time.jsgf):

```
<form id="Time">
<field name="Time">
<prompt>
<audio src="Time.wav">
For what time?
</audio>
</prompt>
<grammar src="time.jsgf"/>
<grammar>midnight{midnight} </grammar>
<filled>
```

```
<if cond="Time == 'midnight' ">
<goto next="#Midnight" />
</if>
<goto next="#C0020" />
</filled>
</field>
</form>
```

Finally, here is an example of a VoiceXML form capable of being generated from the information provided in the graphical callflow for the Time prompt, assuming that 'midnight' IS a valid input for time.jsgf, and that the annotation returned for 'midnight' is 12:00 AM.

```
<form id="Time">
<field name="Time">
<prompt>
<audio src="Time . wav">
For what time?
<audio>
</prompt>
<grammar src="time.jsgf"/>
<filled>
<ifcond="Time == '1200AM' ">
<goto next= "#Midnight" />
</if>
<goto next="#C0020"/>
</filled>
</field>
</form>
```

Note that in searching the grammar (shown in the list below, using a jsgf grammar as an example, but note that this would be workable for any type of grammar that includes recognition text and annotations—including bnf, srcl, SRGS XML, SRGS ABNF, etc.), it could be determined that 'midnight' was in the grammar, and that the annotation for midnight was '1200 AM', which enabled the automatic generation of the <if> statement in the form code above—all capable of being done without any detailed knowledge about the content of the prebuilt grammars on the part of the callflow designer.

```
#JSGF V1.0 iso-8859-1;
grammar time;
public <time> = [<starter>] [<at>] <hour> [o clock] {needampm}
        [<starter>] [<at>] <hour> <minute> {needampm}
        [<starter>] [<at>] <hour> [o clock] <ampm>
        [<starter>] [<at>] <hour> <minute> <ampm>
        [<starter>] [<at>] half past <hour> {needampm}
        [<starter>] [<at>] half past <hour> <ampm>
        [<starter>] [<at>] [a] quarter till <hour> {needampm}
        [<starter>] [<at>] [a] quarter till <hour> <ampm>
        [<starter>] [<at>] <minute> till <hour> {needampm}
        [<starter>] [<at>] <minute> till <hour> <ampm>
        [<starter>] [<at>] <minute> after <hour> {needampm}
        [<starter>] [<at>] <minute> after <hour> <ampm>
        [<starter>] [<at>] noon {noon}
        [<starter>] [<at>] midnight {1200AM}
        ;
<starter> = set
        set time
        set reminder time
        ;
<at> = at
        for
        ;
<hour> = one
        two
        three
        four
        five
        six
        seven
        eight
        nine
        ten
        eleven
        twelve
        ;
<minute> = <units>
        <teens>
        <tens>
        <tens> <units>
        ;
<units> = one
        two
        three
        four
        five
        six
        seven
        eight
        nine
        ;
<teens> = ten
        eleven
        twelve
        thirteen
        fourteen
        fifteen
        sixteen
        seventeen
        eighteen
        nineteen
        ;
<tens> = twenty
        thirty
        forty
        fifty
        ;
<ampm> = AM
        PM
        ;
```

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for generating a speech recognition application call flow from a call flow representation of the speech recognition application call flow specified by a designer using a user interface provided by a call flow design application executing on a computer, the call flow design application configured to allow the designer to create the call flow representation by allowing the user to specify elements of the call flow via the user interface, the method comprising:

adding a representation of a first prompt to the call flow representation in response to at least one designer instruction, received via the user interface provided by the call flow design application executing on the computer, to add the first prompt, the first prompt being defined to solicit a response from a user of the speech recognition application call flow;

adding a representation of at least one grammar, selected by the designer from a list of existing grammars, to the call flow representation in response to at least one designer instruction, received via the user interface provided by the call flow design application executing on the computer, to add the at least one grammar in association with the first prompt, the at least one grammar defining valid responses to the first prompt;

adding a representation of a response option to the call flow representation in response to at least one designer instruction, received via the user interface provided by the call flow design application executing on the computer, to add the response option in association with the first prompt, the response option defining a valid response to the first prompt;

adding a representation of a second prompt to the call flow representation in response to at least one designer instruction, received via the user interface provided by the call flow design application executing on the computer, to add the second prompt, the second prompt to be provided to the user should the user respond to the first prompt with one of the valid responses defined in the at least one grammar;

adding a representation of a third prompt to the call flow representation in response to at least one designer instruction, received via the user interface provided by the call flow design application executing on the computer, to add the third prompt, the third prompt to be provided to the user should the user respond to the first prompt with the response option; and automatically checking whether the response option is defined as a valid response in the at least one grammar; and automatically generating the speech recognition application call flow from the call flow representation such that if the response option is defined as a valid response in the at least one grammar, the third prompt is presented to the user instead of the second prompt when the user responds to the first prompt with the response option.

2. At least one non-transitory computer readable medium encoded with instruction that, when executed on at least one computer, perform a method for generating a speech recognition application call flow from a call flow representation of the speech recognition application call flow specified by a designer using a user interface configured to allow the designer to create the call flow representation, the method comprising:

adding a representation of a first prompt to the call flow representation in response to at least one designer instruction, received via the user interface, to add the first prompt, the first prompt being defined to solicit a response from a user of the speech recognition application call flow;

adding a representation of at least one grammar, selected by the designer from a list of existing grammars, to the call flow representation in response to at least one designer instruction, received via the user interface, to add the at least one grammar in association with the first prompt, the at least one grammar defining valid responses to the first prompt;

adding a representation of a response option to the call flow representation in response to at least one designer instruction, received via the user interface, to add the response option in association with the first prompt, the response option defining a valid response to the first prompt;

adding a representation of a second prompt to the call flow representation in response to at least one designer instruction, received via the user interface, to add the second prompt, the second prompt to be provided to the user should the user respond to the first prompt with one of the valid responses defined in the at least one grammar;

adding a representation of a third prompt to the call flow representation in response to at least one designer instruction, received via the user interface, to add the third prompt, the third prompt to be provided to the user should the user respond to the first prompt with the response option; and automatically checking whether the response option is defined as a valid response in the at least one grammar; and automatically generating the speech recognition application call flow from the call flow representation such that if the response option is defined as a valid response in the at least one grammar, the third prompt is presented to the user instead of the second prompt when the user responds to the first prompt with the response option.

* * * * *